United States Patent
Tsuchiya

(10) Patent No.: US 7,440,047 B2
(45) Date of Patent: *Oct. 21, 2008

(54) LIQUID CRYSTAL DISPLAY DEVICE AND ELECTRONIC APPARATUS HAVING TWO ELLIPTICALLY POLARIZING PLATES

(75) Inventor: Hitoshi Tsuchiya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/808,520

(22) Filed: Jun. 11, 2007

(65) Prior Publication Data

US 2007/0242189 A1    Oct. 18, 2007

Related U.S. Application Data

(62) Division of application No. 11/311,361, filed on Dec. 20, 2005, now Pat. No. 7,248,311, which is a division of application No. 10/678,313, filed on Oct. 6, 2003, now Pat. No. 7,239,362.

(30) Foreign Application Priority Data

Nov. 8, 2002    (JP) ............................. 2002-325240

(51) Int. Cl.
   *G02F 1/1335*    (2006.01)
(52) U.S. Cl. .......................... 349/96; 349/98; 349/114; 349/119; 349/121
(58) Field of Classification Search .................. 349/96, 349/98, 114, 117, 119, 121, 132; 359/494, 359/500; 428/1.3, 1.31
See application file for complete search history.

(56) References Cited

U.S. PATENT DOCUMENTS 5,583,679 A    12/1996    Ito et al.
6,778,242 B1    8/2004    Murayama et al.
2002/0041352 A1    4/2002    Kuzuhara et al.

(Continued)

FOREIGN PATENT DOCUMENTS

JP    B-2587398    12/1996

(Continued)

*Primary Examiner*—Dung T. Nguyen
*Assistant Examiner*—Tai Duong
(74) *Attorney, Agent, or Firm*—Oliff & Berridge, PLC

(57) ABSTRACT

The invention provides a semi-transparent reflective liquid crystal display device in which bright display, high contrast, and less viewing-angle dependency are possible in a transmission mode. In the liquid crystal display device according to the present invention, a polarizing plate can be disposed on the upper side of a liquid crystal cell in which a semi-transparent reflective layer is formed on a lower substrate and the thickness of a liquid crystal layer in a transmissive display region can be made to be different from the thickness of a liquid crystal layer in a reflective display region by a layer-thickness adjusting layer. A uniaxially stretched phase difference film can be interposed between the polarizing plate and the liquid crystal cell, and a liquid crystal film fixed in nematic hybrid alignment can be interposed between the phase difference film and the liquid crystal cell. A polarizing plate can be disposed on the lower side of the liquid crystal cell, a uniaxially stretched phase difference film can be interposed between the polarizing plate and the liquid crystal cell, and a liquid crystal film fixed in nematic hybrid alignment can be interposed between the phase difference film 6 and the liquid crystal cell.

4 Claims, 12 Drawing Sheets

U.S. PATENT DOCUMENTS

| | | |
|---|---|---|
| 2003/0112414 A1 | 6/2003 | Yoshioka et al. |
| 2003/0164921 A1 | 9/2003 | Uesaka et al. |
| 2003/0218709 A1 | 11/2003 | Ito et al. |
| 2004/0119920 A1 | 6/2004 | Uesaka et al. |
| 2005/0057704 A1 | 3/2005 | Ootake et al. |

FOREIGN PATENT DOCUMENTS

| | | |
|---|---|---|
| JP | B2-2640083 | 5/1997 |
| JP | A-10-186356 | 7/1998 |
| JP | A-11-194325 | 7/1999 |
| JP | A-11-194371 | 7/1999 |
| JP | A-2000-275434 | 10/2000 |
| JP | A-2002-31717 | 1/2002 |
| JP | A-2002-311426 | 10/2002 |
| JP | A-2003-322855 | 11/2003 |
| KR | A-1999-0063491 | 7/1999 |
| KR | A-2002-0009434 | 2/2002 |
| WO | WO 01/88574 | 11/2001 |
| WO | WO 01/90808 A1 | 11/2001 |

F I G. 4
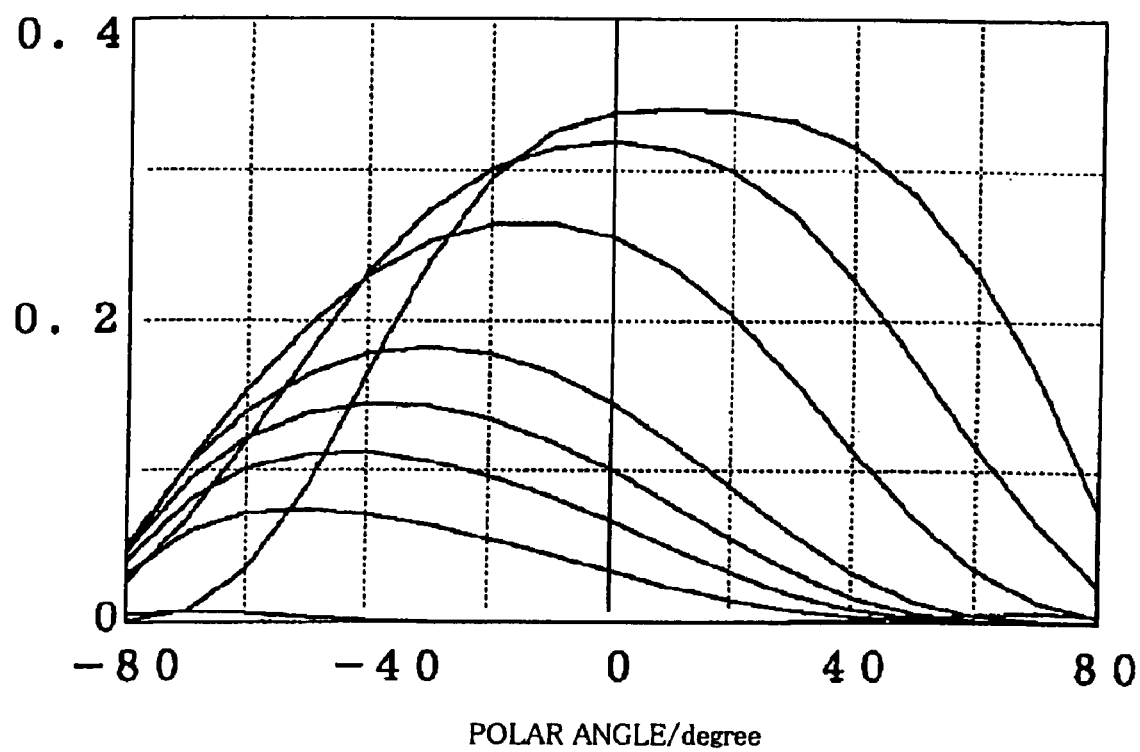
POLAR ANGLE/degree

POLAR ANGLE/degree

LIQUID CRYSTAL DISPLAY DEVICE AND ELECTRONIC APPARATUS HAVING TWO ELLIPTICALLY POLARIZING PLATES

This is a Division of application Ser. No. 11/311,361 (now U.S. Pat. No. 7,248,311), filed Dec. 20, 2005, which in turn is a Division of application Ser. No. 10/678,313 (now U.S. Pat. No. 7,239,362), filed Oct. 6, 2003. The disclosures of the prior applications are incorporated by reference in their entirety.

BACKGROUND OF THE INVENTION

1. Field of Invention

The present invention relates to a liquid crystal device. More particularly, the invention relates to a semi-transparent reflective liquid crystal display device.

2. Description of Related Art

Related art liquid crystal display devices can be broadly classified into three types, namely, a transparent type capable of image display in a transmission mode, a reflective type capable of image display in a reflection mode, and a semi-transparent reflective type capable of image display in both the transmission and reflection modes, and can be used as displays in notebook personal computers, televisions, and other devices because of their features, for example, thin style and light weight. In particular, semi-transparent reflective liquid crystal display devices can be used in various portable electronic apparatus because they adopt a combination of a transmission display mode and a reflection display mode, and can perform bright display with less power consumption even in a bright place or in a dark place by switching the display mode according to ambient brightness.

One type of such a semi-transparent reflective liquid crystal display device includes a liquid crystal display device in which a reflective layer made of a film of aluminum or the like, having slits (apertures) to transmit light, is provided on the surface of a lower substrate facing a liquid crystal layer to function as a semi-transparent reflective layer.

FIG. 11 shows an example of a semi-transparent reflective liquid crystal display device using this type of semi-transparent reflective layer.

In such a liquid crystal display device 100, a liquid crystal layer 103 is held between a pair of transparent substrates 101 and 102. A reflective layer 104 and an insulating film 106 are stacked on the lower substrate 101, and a lower electrode 108 made of a transparent conductive film of indium tin oxide (hereinafter "ITO") or the like is formed thereon. An alignment film 107 is formed to cover the lower electrode 108. On the other hand, a color filter 109 having R (red), G (green) and B (blue) pigment layers is formed on the upper substrate 102, and a flattening film 111 is stacked thereon. Upper electrodes 112 made of a transparent conductive film of ITO or the like are formed on the flattening film 111, and an alignment film 113 is formed to cover the upper electrodes 112.

The reflective layer 104 is made of a metal film having a high reflectance, such as aluminum, and is provided with light-transmitting slits 110 corresponding to pixels. The slits 110 allow the reflective layer 104 to function as a semi-transparent reflective layer (hereinafter the layer is referred to as a "semi-transparent reflective layer"). A forward scattering plate 118, a phase difference film 119, and an upper polarizing plate 114 are arranged in that order on the outer surface of the upper substrate 102, and a phase difference film 115 and a lower polarizing plate 116 are arranged in that order on the outer surface of the lower substrate 101. A backlight 117 (an illumination device) is disposed under the lower surface of the lower substrate 101 and further under the lower polarizing plate 116.

In order to use the liquid crystal display device 100 shown in FIG. 11 in a bright place and in a reflection mode, external light, such as sunlight or illumination light, incidents from the upper side of the upper substrate 102, passes through the liquid crystal layer 103 and is reflected by the surface of the semi-transparent reflective layer 104 on the lower substrate 101, then passes again through the liquid crystal layer 103, and emits out of the upper side of the upper substrate 102. During the use in a dark place and in a transmission mode, light emitted from the backlight 117 disposed under the lower substrate 101 passes through the slits 110 of the semi-transparent reflective layer 104, passes through the liquid crystal layer 103, and emits out of the upper side of the upper substrate 102. Such light contributes to the display quality in each mode.

When the transmissive, reflective, and semi-transparent reflective liquid crystal display devices are viewed from the oblique direction, particularly in a transmission mode, problems regarding the viewing angle, for example, deterioration in display contrast, changes in display color, and tone reversal, are inevitable because of refractive index anisotropy of liquid crystal molecules. Therefore, it is advantageous to solve or address the above problems.

In related art transmissive liquid crystal display devices using a TN mode (twist angle of liquid crystal is 90°), as a method for addressing or solving the problems, the arrangement of optical compensation films between a liquid crystal cell and upper and lower polarizing plates can be manipulated.

One example is a structure in which optical compensation films having discotic liquid crystal aligned in hybrid alignment are disposed between a liquid crystal cell and upper and lower polarizing plates. Another example is a structure in which optical compensation films having liquid crystal polymers aligned in nematic hybrid alignment are disposed between a liquid crystal cell and upper and lower polarizing plates. This is disclosed in Japanese Patent Publication No. 2640083, Japanese Patent Laid-Open No. 11-194325, and Japanese Patent Laid-Open No. 11-194371.

In semi-transparent reflective liquid crystal display devices, it is necessary, on the principle of display, to provide circularly polarizing plates, each including one or more stretched films and a polarizing plate, on the upper side of a liquid crystal cell and between a semi-transparent reflective layer and a backlight in the transmission mode.

In order to increase the viewing angle in the transmission mode of the semi-transparent reflective liquid crystal display devices, a method using an optical compensation film of nematic hybrid alignment in the circularly polarizing plate disposed between the semi-transparent reflective layer and the backlight can be used. This is disclosed in Japanese Patent Laid-Open No. 2002-31717.

SUMMARY OF THE INVENTION

However, the above methods do not overcome the problems regarding the viewing angle caused when the device is viewed from the oblique direction, for example, deterioration in display contrast, changes in display color, and tone reversal. In particular, since the semi-transparent reflective liquid crystal devices use a circularly polarizing plate composed of one or more stretched films and a polarizing plate in principle, as described above, it is essentially difficult to increase the viewing angle.

In view of the above, the present invention provides a semi-transparent reflective liquid crystal display device in which bright display, high contrast, and low viewing-angle dependency are possible particularly in a transmission mode. The present invention provides an electronic apparatus having the above liquid crystal device in which bright display, high contrast, and low viewing-angle dependency are possible particularly in a transmission mode.

In order to address or solve the above, the present invention provides a liquid crystal display device that includes a liquid crystal cell in which a liquid crystal layer is held between an upper substrate and a lower substrate opposing each other, and a semi-transparent reflective layer is provided on a side of the lower substrate close to the liquid crystal layer. The liquid crystal display device further includes a first elliptically polarizing plate to cause elliptically polarized light to enter the liquid crystal layer through the upper substrate, and a second elliptically polarizing plate to cause elliptically polarized light to enter the liquid crystal layer through the lower substrate. Each of the first elliptically polarizing plate and the second elliptically polarizing plate has a liquid crystal film fixed in hybrid alignment.

In the liquid crystal display device of the present invention, each of the elliptically polarizing plates on the upper and lower sides of the liquid crystal cell includes at least one liquid crystal film fixed in hybrid alignment. For this reason, the refractive index anisotropy of liquid crystal molecules in the liquid crystal cell can be compensated for by the liquid crystal films fixed in hybrid alignment disposed on the upper and lower sides of the liquid crystal cell. This makes it possible to provide a liquid crystal display device that exhibits a superior viewing angle characteristic in a transmission mode.

In the present invention, preferably, each of the first elliptically polarizing plate and the second elliptically polarizing plate includes a polarizing plate to transmit linearly polarized light, at least one liquid crystal film fixed in nematic hybrid alignment, and at least one stretched film.

Each of the first elliptically polarizing plate and the second elliptically polarizing plate may include a polarizing plate, at least one liquid crystal film fixed in nematic hybrid alignment, and at least one stretched film. Consequently, it is possible to achieve a broadband elliptically polarizing plate, and a higher-contrast liquid crystal display device.

There are no restrictions on the stretched film to be used, and a related art or known stretched film, such as a uniaxially stretched film or a biaxially stretched film, may be used.

In the present invention, angles formed between the phase-retarding axes of the liquid crystal films fixed in nematic hybrid alignment in the first elliptically polarizing plate, and the second elliptically polarizing plate and an axis including the distinct viewing direction of the liquid crystal layer, are normally within the range from plus 30 degrees to minus 30 degrees, preferably, from plus 10 degrees to minus 10 degrees, and more preferably, from plus 5 degrees to minus 5 degrees. Within these ranges, refractive index anisotropy of liquid crystal molecules in the liquid crystal cell can be compensated for by the liquid crystal films fixed in nematic hybrid alignment, and a liquid crystal display device having a good viewing angle characteristic can be achieved. Moreover, an area in which tone reversal during transmissive display is caused, when the liquid crystal display device is viewed from the oblique direction, can be reduced.

Herein, the distinct viewing direction refers to the azimuth direction of a director of liquid crystal molecules at almost the center of the liquid crystal layer.

In the present invention, while the in-plane phase differences of the liquid crystal films fixed in nematic hybrid alignment in the first elliptically polarizing plate and the second elliptically polarizing plate depend on the optical parameters of the liquid crystal display device, not generally but preferably, they being within a range from 90 nm to 140 nm with respect to monochromatic light of 589 nm.

In normal cases, a substantially quarter-wave stretched film and a substantially half-wave stretched film constitute a broadband elliptically polarizing plate. When a liquid crystal film fixed in nematic hybrid alignment has in-plane phase differences within the above range, it can constitute a broadband elliptically polarizing plate with a substantially half-wave stretched film.

In the present invention, the first elliptically polarizing plate and the second elliptically polarizing plate may include the polarizing plate, at least one liquid crystal film fixed in discotic hybrid alignment, and at least one stretched film. In such a way, a broadband elliptically polarizing plate and a high-contrast liquid crystal display device can be achieved.

There are no restrictions on the stretched film to be used, and a related art or known stretched film, such as a uniaxially stretched film or a biaxially stretched film, may be used.

In the present invention, angles formed between the phase-advancing axes of the liquid crystal films fixed in discotic hybrid alignment in the first elliptically polarizing plate, and the second elliptically polarizing plate and an axis including the distinct viewing direction of the liquid crystal layer, are normally within the range from plus 30 degrees to minus 30 degrees, preferably, from plus 10 degrees to minus 10 degrees, and more preferably, from plus 5 degrees to minus 5 degrees. Within such ranges, refractive index anisotropy of liquid crystal molecules in the liquid crystal cell can be compensated for by the liquid crystal films fixed in discotic hybrid alignment, and a liquid crystal display device having a good viewing angle characteristic can be achieved. Moreover, an area in which tone reversal during transmission display is caused when the liquid crystal display device is viewed from the oblique direction can be reduced.

Herein, the distinct viewing direction refers to the azimuth direction of a director of liquid crystal molecules at almost the center of the liquid crystal layer.

In the present invention, the first elliptically polarizing plate may include a polarizing plate, at least one liquid crystal film fixed in nematic hybrid alignment, and at least one stretched film, and the second elliptically polarizing plate may include a polarizing plate, at least one liquid crystal film fixed in discotic hybrid alignment, and at least one stretched film. This can also achieve a high-contrast liquid crystal display device.

There are no restrictions on the stretched film to be used, and a related art or known stretched film, such as a uniaxially stretched film or a biaxially stretched film, may be used.

In the present invention, an angle formed between the phase-retarding axis of the liquid crystal film fixed in nematic hybrid alignment in the first elliptically polarizing plate and the axis including the distinct viewing direction of the liquid crystal layer, and an angle formed between the phase-advancing axis of the liquid crystal film fixed in discotic hybrid alignment in the second elliptically polarizing plate and the axis including the distinct viewing direction of the liquid crystal layer, are normally within the range from plus 30 degrees to minus 30 degrees, preferably, from plus 100 degrees to minus 10 degrees, and more preferably, from plus 5 degrees to minus 5 degrees. Within such ranges, refractive index anisotropy of liquid crystal molecules in the liquid crystal cell can be compensated for by the liquid crystal films, and a liquid crystal display device having a good viewing angle characteristic can be achieved. Moreover, an area in which tone reversal during transmission display is caused when the liquid crystal display device is viewed from the oblique direction can be reduced.

Herein, the distinct viewing direction refers to the azimuth direction of a director of liquid crystal molecules at almost the center of the liquid crystal layer.

In the present invention, while the in-plane phase differences of the liquid crystal film fixed in nematic hybrid alignment in the first elliptically polarizing plate depend on the optical parameters of the liquid crystal display device, preferably, it is within the range from 90 nm to 140 nm with respect to monochromatic light of 589 nm.

In normal cases, a substantially quarter-wave stretched film and a substantially half-wave stretched film constitute a broadband elliptically polarizing plate. When a liquid crystal film fixed in nematic hybrid alignment has in-plane phase differences within the above range, it can constitute a broadband elliptically polarizing plate with a substantially half-wave retardation film.

In the present invention, the first elliptically polarizing plate may include the polarizing plate, at least one liquid crystal film fixed in discotic hybrid alignment, and at least one stretched film, and the second elliptically polarizing plate may include the polarizing plate, at least one liquid crystal film fixed in nematic hybrid alignment, and at least one stretched film. This can also achieve a high-contrast liquid crystal display device.

There are no restrictions on the stretched film to be used, and a related art or known stretched film, such as a uniaxially stretched film or a biaxially stretched film, may be used.

In the present invention, an angle formed between the phase-advancing axis of the liquid crystal film fixed in discotic hybrid alignment in the first elliptically polarizing plate and the axis including the distinctive viewing direction of the liquid crystal layer, and an angle formed between the phase-retarding axis of the liquid crystal film fixed in nematic hybrid alignment in the second elliptically polarizing plate and the axis including the distinctive viewing direction of the liquid crystal layer, are normally within the range from plus 30 degrees to minus 30 degrees, preferably, from plus 10 degrees to minus 10 degrees, and more preferably, from plus 5 degrees to minus 5 degrees. Within such ranges, refractive index anisotropy of liquid crystal molecules in the liquid crystal cell can be compensated for by the liquid crystal films, and a liquid crystal display device having a good viewing angle characteristic can be achieved.

Herein, the distinctive viewing direction refers to the azimuth direction of a director of liquid crystal molecules at almost the center of the liquid crystal layer.

In the present invention, while the in-plane phase differences of the liquid crystal film fixed in nematic hybrid alignment in the second elliptically polarizing plate depend on the optical parameters of the liquid crystal display device, not generally but preferably, it is within the range from 90 nm to 140 nm with respect to monochromatic light of 589 nm.

In normal cases, a substantially quarter-wave stretched film and a substantially half-wave stretched film constitute a broadband elliptically polarizing plate. When a liquid crystal film fixed in nematic hybrid alignment has an in-plane phase differences within the above range, it can constitute a broadband elliptically polarizing plate. with a substantially half-wave stretched film.

In the present invention, it is preferable that the liquid crystal cell has a layer-thickness adjusting layer making the thickness of the liquid crystal layer smaller in a reflective display region than the thickness of the liquid crystal layer in a transmissive display region.

In a semi-transparent reflective liquid crystal display device, transmitted display light emits out after passing through the liquid crystal layer only once. In contrast, reflected display light passes the liquid crystal layer twice. Therefore, it is difficult to optimize retardations Δn·d of both the transmitted display light and the reflected display light. By adding the layer-thickness adjusting layer making the thickness of the liquid crystal layer of the reflective display region different from that of the transmissive display region, the retardations Δn·d of the transmitted display light and the reflected display light can be optimized, and both of bright reflective display and transmissive display are made possible.

Such a structure is called a "multigap structure", and, for example, can be achieved by providing a layer-thickness adjusting layer 120 under a lower electrode 108 made of a transparent conductive film of ITO or the like and over a semi-transparent reflective layer 104, as shown in FIG. 12. That is, since the thickness of a liquid crystal layer 103 is larger in a transmissive display region corresponding to a slit 110 because of the thickness of the layer-thickness adjusting layer 120 than that in a reflective display region, the retardations Δn·d of both the transmitted display light and reflected display light can be optimized. In order to adjust the thickness of the liquid crystal layer 103, the layer-thickness adjusting layer 120 needs to be thick, and photosensitive resin or the like is used to form such a thick layer. Since basic structures are common to FIGS. 11 and 12, components having common functions are denoted by the same reference numerals.

In the present invention, the liquid crystal layer may adopt a twisted nematic mode. It is preferable, from a viewpoint of brightness of transmissive display, that the twist angle of the liquid crystal layer is within the range from 10 degrees to 50 degrees.

In the present invention, preferably, the liquid crystal layer adopts homogeneous alignment, and the twist angle thereof is zero degrees. The homogeneous liquid crystal layer having a twist angle of zero degrees allows transmission brightness to be enhanced or maximized without sacrificing reflection brightness in a multigap liquid crystal display device.

The liquid crystal display device to which the present invention has been applied may be used as a display of an electronic apparatus such as portable telephones and mobile computers.

[Exemplary Advantages of the Invention]

In the liquid crystal display device of the present invention, the upper elliptically polarizing plate and the lower elliptically polarizing plate use liquid crystal films fixed in hybrid alignment. For this reason, the liquid crystal films fixed in hybrid alignment, being disposed on the upper and lower sides of the liquid crystal cell can compensate for the refractive index anisotropy of liquid crystal molecules in the liquid crystal cell. Therefore, particularly in the transmission mode, problems caused when the device is viewed from the oblique direction, such as deterioration in display contrast, changes in display color, and tone reversal, can be enhanced. Moreover, it is possible to achieve a liquid crystal display device that provides bright display and high contrast.

BRIEF DESCRIPTION OF THE DRAWINGS

FIG. 4 is a graph showing the viewing angle characteristic of the transmittance in the direction of a rubbing axis when the liquid crystal display device according to the exemplary embodiment performs display in an eight-step gradation;

DETAILED DESCRIPTION OF PREFERRED EMBODIMENTS

Exemplary embodiments for carrying out the present invention are described below with reference to the drawings. In the following exemplary embodiment, the retardation $\Delta n \cdot d$ is a value for 589 nm, unless otherwise specified, and the axial angle in the anticlockwise direction regarding a reference axis when viewed from the upper side of a liquid crystal cell, is designated as having a positive value.

Exemplary Embodiment

Figure 1:
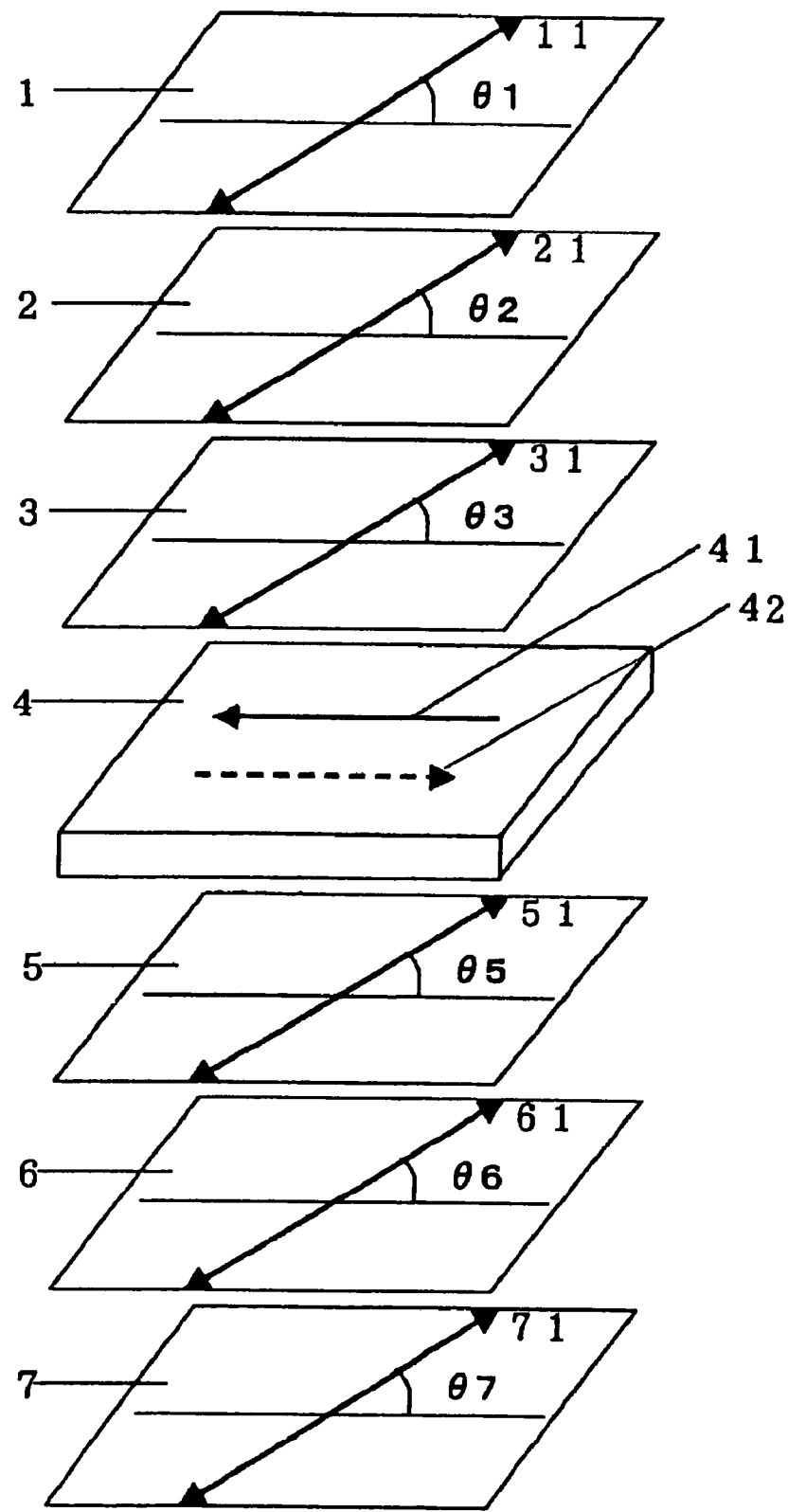
FIG. 1 is a schematic of a liquid crystal display device according to an exemplary embodiment.

FIG. 1 is a schematic of a liquid crystal display device according to this exemplary embodiment. In a liquid crystal cell 4, a semi-transparent reflective layer is provided on a lower substrate, and the thickness of a liquid crystal layer is made different between a transmissive display region and a reflective display region by a layer-thickness adjusting layer. Regarding cell parameters, the retardation $\Delta n \cdot d$ is 0.32 micrometer in the transmissive display region and the retardation $\Delta n \cdot d$ is 0.14 micrometer in the reflective display region, the alignment of the liquid crystal is homogeneous, and the twist angle is set at zero degrees. A polarizing plate 1 is disposed over the upper side of the liquid crystal cell 4, a uniaxially stretched phase difference film 2 is interposed between the polarizing plate 1 and the liquid crystal cell 4, and a liquid crystal film 3 fixed in nematic hybrid alignment is interposed between the phase difference film 2 and the liquid crystal cell 4. In this case, the angles $\theta1$, $\theta2$, and $\theta3$ are formed respectively with reference to a rubbing axis 41 for the upper substrate of the liquid crystal cell 4, the rubbing axis 41 being equal to the distinct viewing direction in this embodiment: the angle $\theta1$ is formed between the rubbing axis 41 and a transmission axis 11 of the polarization plate 1; the angle $\theta2$ is formed between the rubbing axis 41 and a phase-retarding axis 21 of the phase difference film 2; the angle $\theta3$ is formed between the rubbing axis 41 and a phase-retarding axis 31 of the liquid crystal film 3. $\theta1$ is 4 degrees, $\theta2$ is 115 degrees, and $\theta3$ is zero degrees. Furthermore, the retardation $\Delta n \cdot d$ of the phase difference film 2 is approximately 0.25 micrometer, and the retardation $\Delta n \cdot d$ of the liquid crystal film 3 is approximately 0.09 micrometer.

Herein, the retardation $\Delta n \cdot d$ of the liquid crystal film is a value in a plane, as viewed from the direction of the normal to the liquid crystal film.

Also, a polarizing plate 7 is disposed under the lower side of the liquid crystal cell 4, a phase difference film 6 is interposed between the polarizing plate 7 and the liquid crystal cell 4, and a liquid crystal film 5 fixed in nematic hybrid alignment is interposed between the phase difference film 6 and the liquid crystal cell 4. In this case, the angles $\theta5$, $\theta6$, and $\theta7$ are formed respectively with reference to a rubbing axis 42 for the lower substrate of the liquid crystal cell 4: the angle $\theta5$ is formed between the rubbing axis 42 and a phase-retarding axis 51 of the liquid crystal film 5; the angle $\theta6$ is formed between the rubbing axis 42 and a phase-retarding axis 61 of the phase difference film 6; the angle $\theta7$ is formed between the rubbing axis 42 and a transmission axis 71 of the polarizing plate 7. $\theta5$ is zero degrees, $\theta6$ is 66 degrees, and $\theta7$ is 88 degrees. Furthermore, the retardation $\Delta n \cdot d$ of the phase difference film 6 is approximately 0.26 micrometer, and the retardation $\Delta n \cdot d$ of the liquid crystal film 5 is approximately 0.09 micrometer.

Since the liquid crystal films 3 and 5 used here are fixed in the nematic hybrid alignment, the display performance differs depending on the tilting direction and the positional relationship of the upper and lower sides of the films with the liquid crystal cell 4. It is preferable to determine the arrangement in consideration of the display performance and the like, although it is not specified in this exemplary embodiment.

Figure 2:
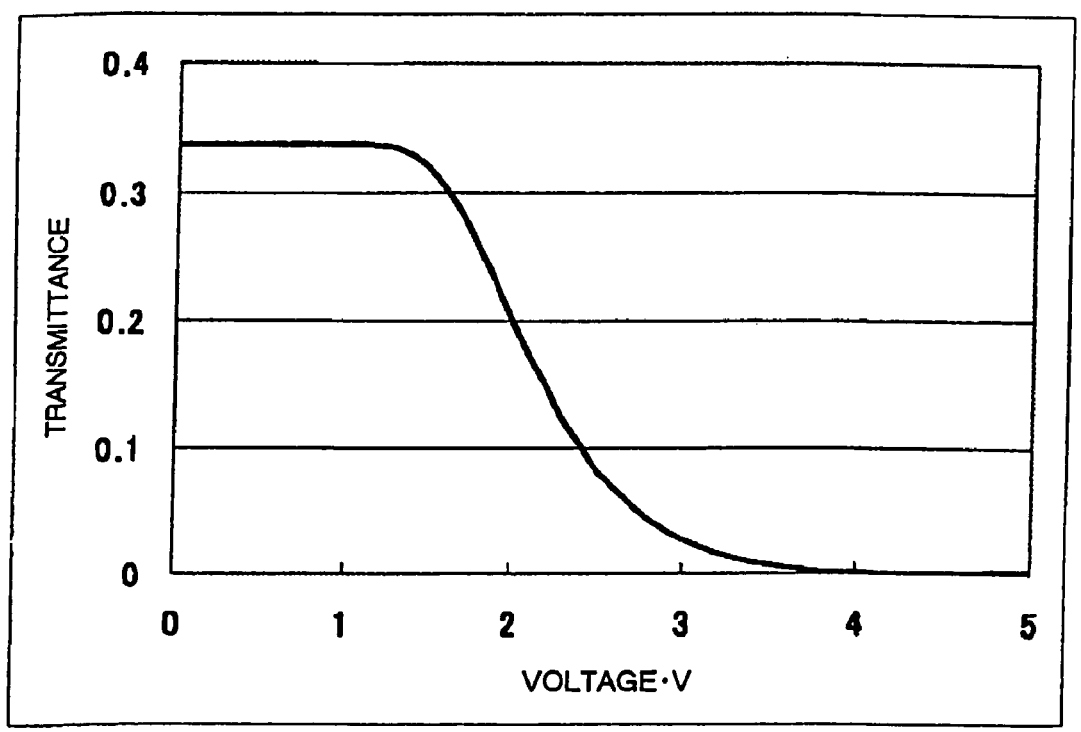
FIG. 2 is a graph showing the transmittance of the liquid crystal display device according to the exemplary embodiment with respect to changes in voltage.
Figure 3:
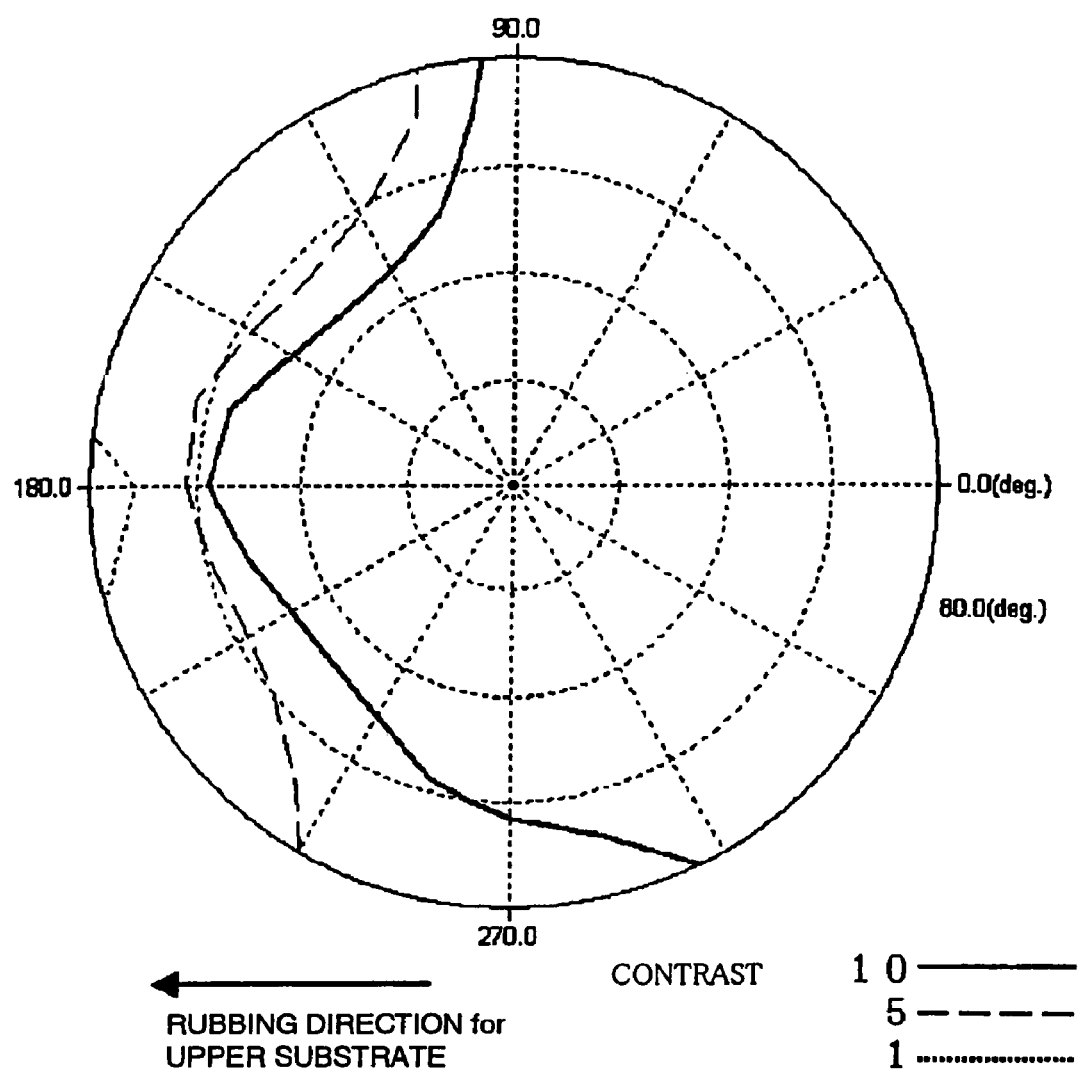
FIG. 3 is a schematic showing the contrast ratios of the liquid crystal display device according to the exemplary embodiment, when the liquid crystal display device is viewed at all the azimuths.

FIG. 2 shows the transmittance with respect to the applied voltage in a transmission mode of the liquid crystal display device of this exemplary embodiment. FIG. 3 shows the contrast ratios at all the azimuths in the transmission mode when the voltage for white display is 0 V and the voltage for black display is 4.3 V. FIG. 4 shows the viewing angle characteristic of the transmittance in the direction of the rubbing axis of the liquid crystal cell in the transmission mode when display is performed in an eight-step gradation from white display at 0 V to black display at 4.3 V.

COMPARATIVE EXAMPLE

Figure 5:
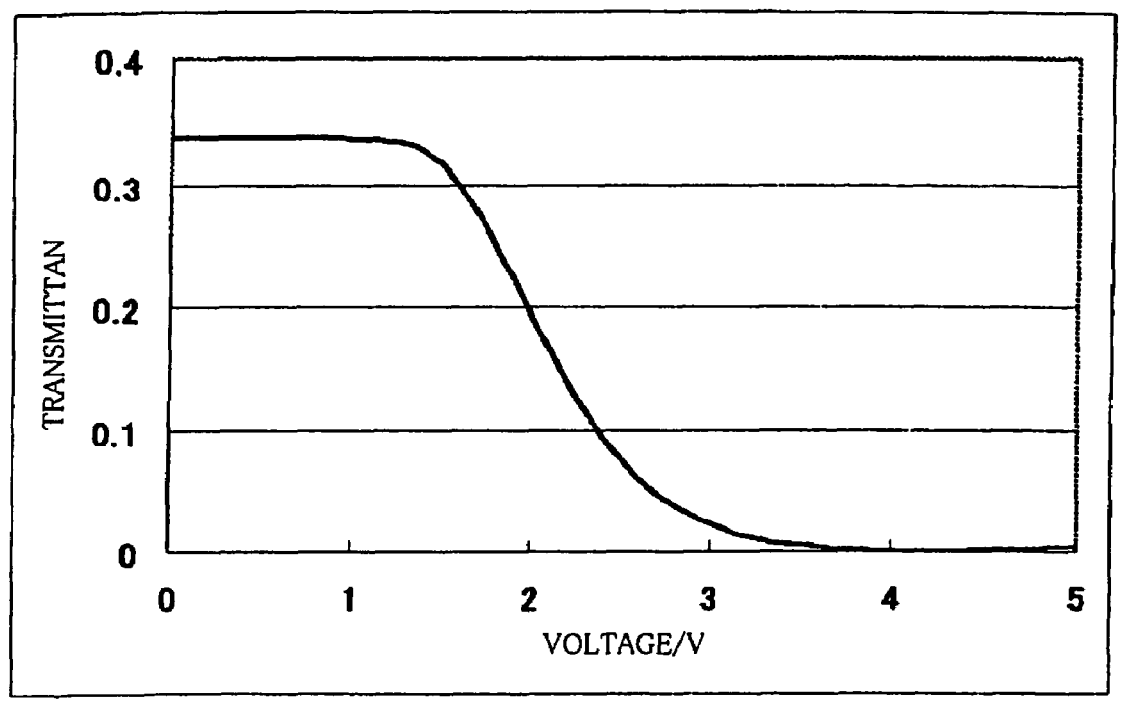
FIG. 5 is a graph showing the transmittance of a liquid crystal display device as a comparative example with respect to changes in voltage.

In the configuration of this exemplary embodiment, the liquid crystal film 3 was replaced with a uniaxially stretched phase difference film ($\Delta n \cdot d$ is approximately 0.11 micrometer), $\Delta n \cdot d$ of the phase difference film 2 was set at approximately 0.28 micrometer, $\Delta n \cdot d$ of the liquid crystal film 5 was set at approximately 0.09 micrometer, and $\Delta n \cdot d$ of the phase difference film 6 was set at approximately 0.28 micrometer. Furthermore, the angles $\theta1$, $\theta2$, $\theta3$, $\theta5$, $\theta6$, and $\theta7$ were set, respectively at 15 degrees, 120 degrees, zero degrees, zero degrees, 65 degrees, and 85 degrees. FIG. 5 shows the transmittance with respect to the applied voltage in a transmission mode of the liquid crystal display device after the above changes have been made.

Figure 6:
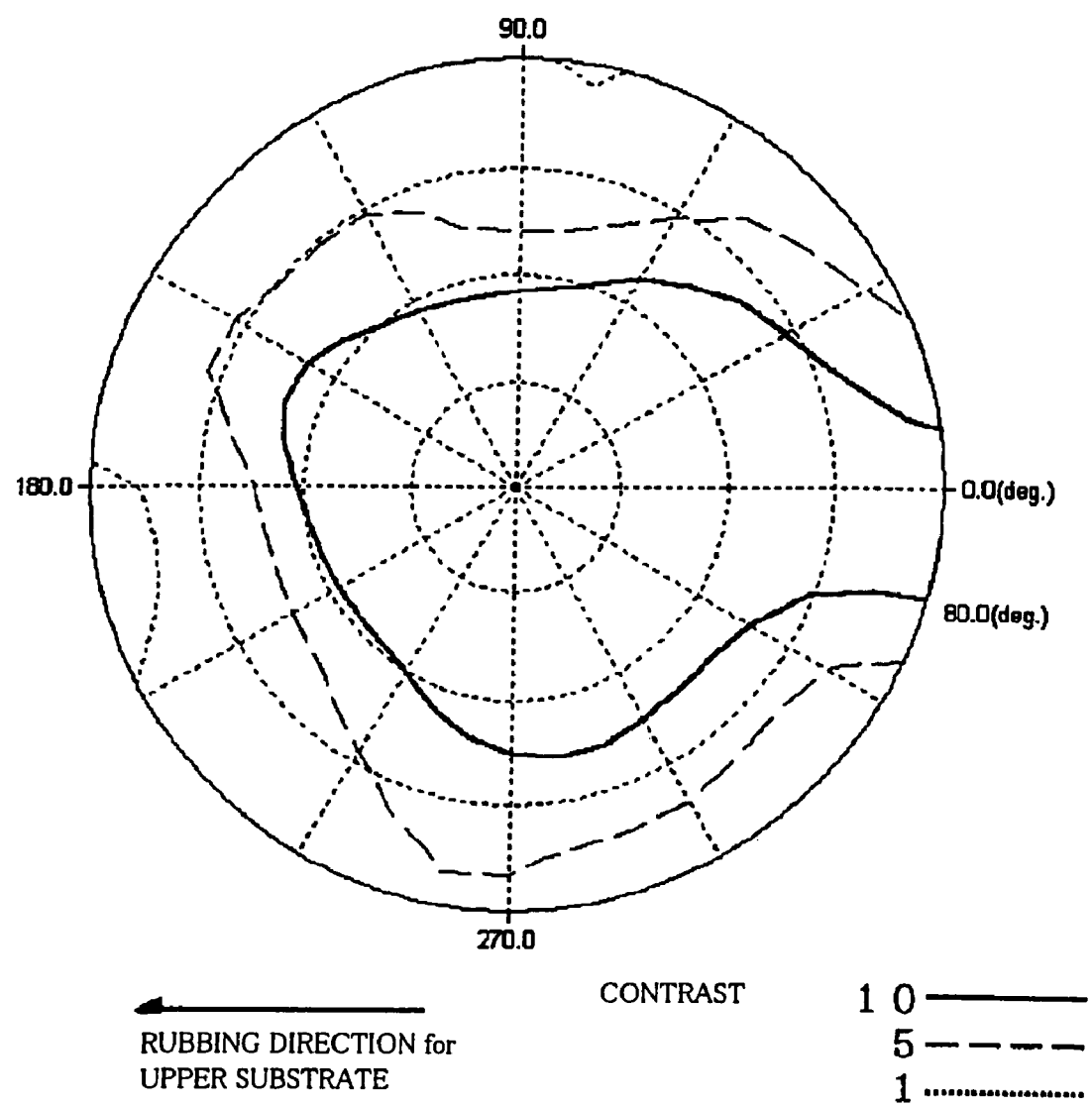
FIG. 6 is a schematic showing the contrast ratios of the liquid crystal display device as the comparative example, when the liquid crystal display device is viewed at all the azimuths.
Figure 7:
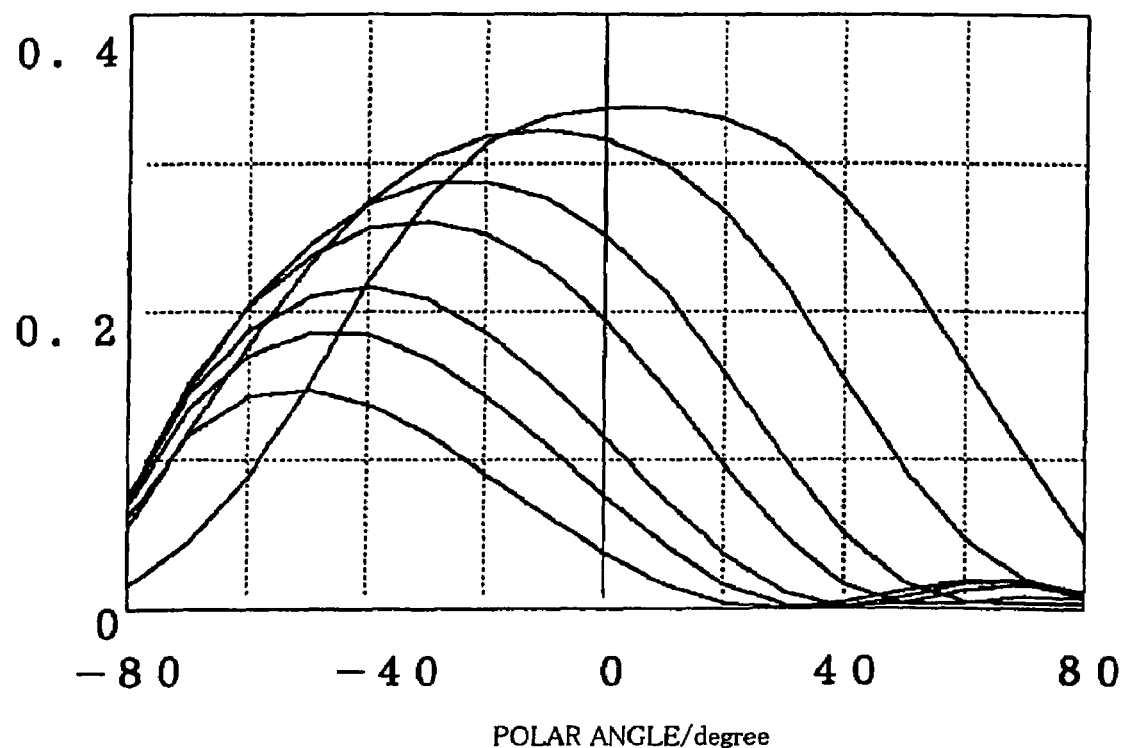
FIG. 7 is a graph showing the viewing angle characteristic of the transmittance in the direction of a rubbing axis when the liquid crystal display device as the comparative example performs display in an eight-step gradation.

FIG. 6 shows the contrast ratios at all the azimuths in the transmission mode when the voltage for white display is 0 V and the voltage for black display is 4.3 V. FIG. 7 shows the viewing angle characteristic of the transmittance in the direction of the rubbing axis of the liquid crystal cell in the transmission mode when display is performed in an eight-step gradation from white display at 0 V to black display at 4.3 V.

The comparison of these characteristics reveals that the viewing angle characteristic is enhanced by using the liquid crystal films fixed in nematic hybrid alignment for the elliptically polarizing plates disposed over the upper side and under the lower side of the liquid crystal cell, as in this exemplary embodiment.

While the liquid crystal films fixed in nematic hybrid alignment are used as the liquid crystal films in the upper and lower elliptically polarizing plates in this exemplary embodiment, similar advantages can be obtained by using liquid crystal films fixed in discotic hybrid alignment. Furthermore, similar advantages can also be obtained when the upper and lower elliptically polarizing plates include, respectively, a liquid crystal film fixed in nematic hybrid alignment and a liquid crystal film fixed in discotic hybrid alignment.

Exemplary Applications of Liquid Crystal Display Device to Electronic Apparatus

The liquid crystal display device having such a configuration can be used as displays of various electronic apparatus. Examples thereof are described below with reference to FIGS. 8, 9, and 10.

Figure 8:
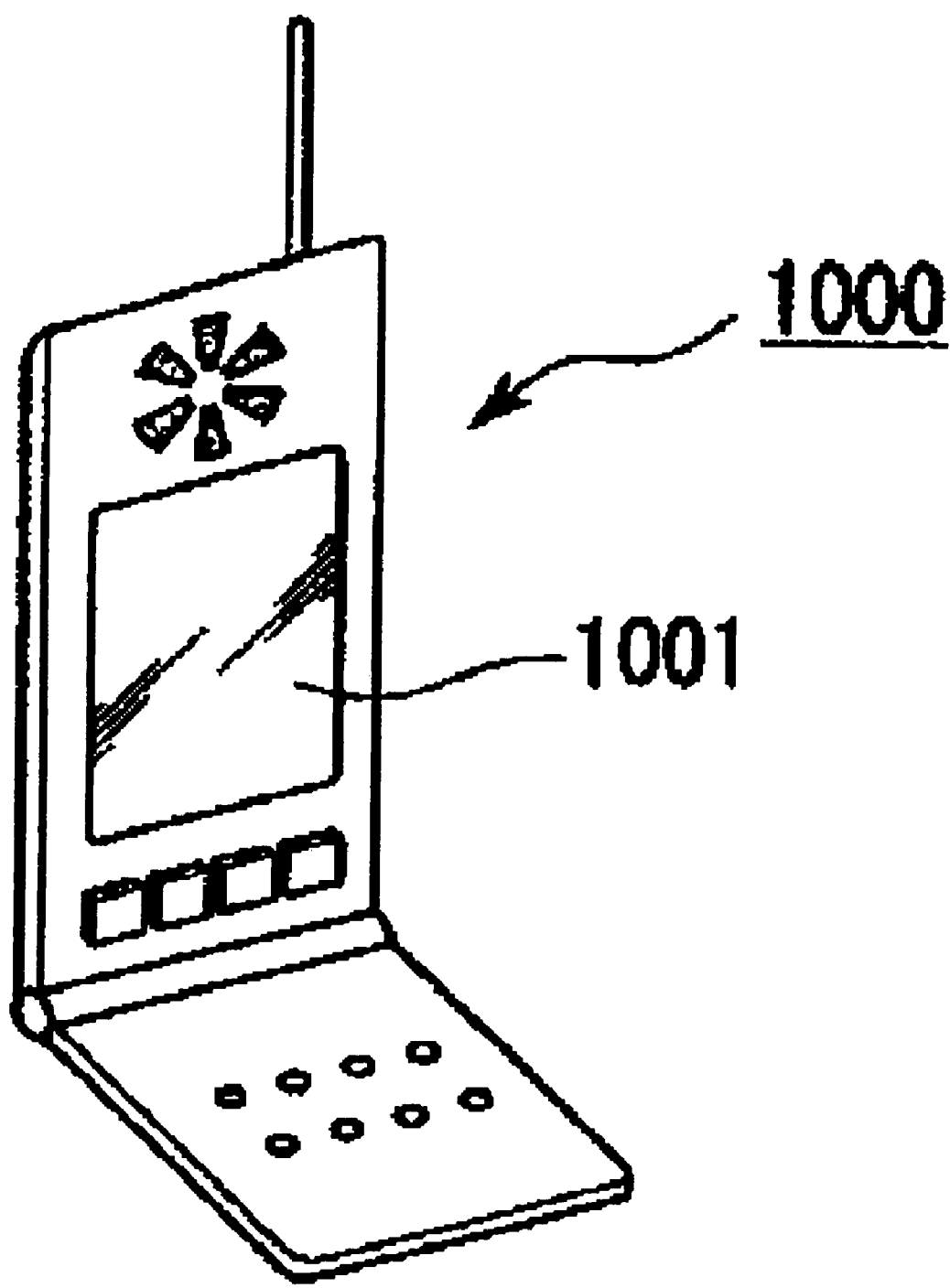
FIG. 8 is a schematic showing an example of an electronic apparatus using the liquid crystal display device according to the present invention as a display.

FIG. 8 is a perspective view showing an example of a portable telephone. In FIG. 8, reference numeral 1000 denotes a main body of the portable telephone, and reference numeral 1001 denotes a liquid crystal display using the above-described liquid crystal display device.

Figure 9:
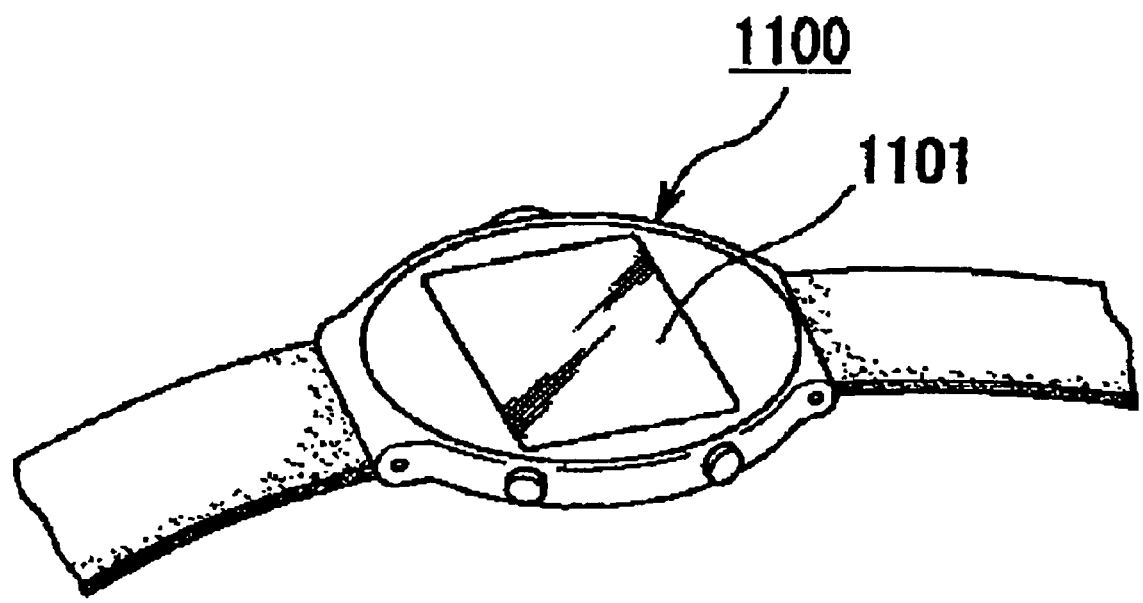
FIG. 9 is a schematic showing another example of an electronic apparatus using the liquid crystal display device according to the present invention as a display.

FIG. 9 is a perspective view showing an example of a wristwatch-type electronic apparatus. In FIG. 9, reference numeral 1100 denotes a main body of the wristwatch, and reference numeral 1101 denotes a liquid crystal display using the above-described liquid crystal display device.

Figure 10:
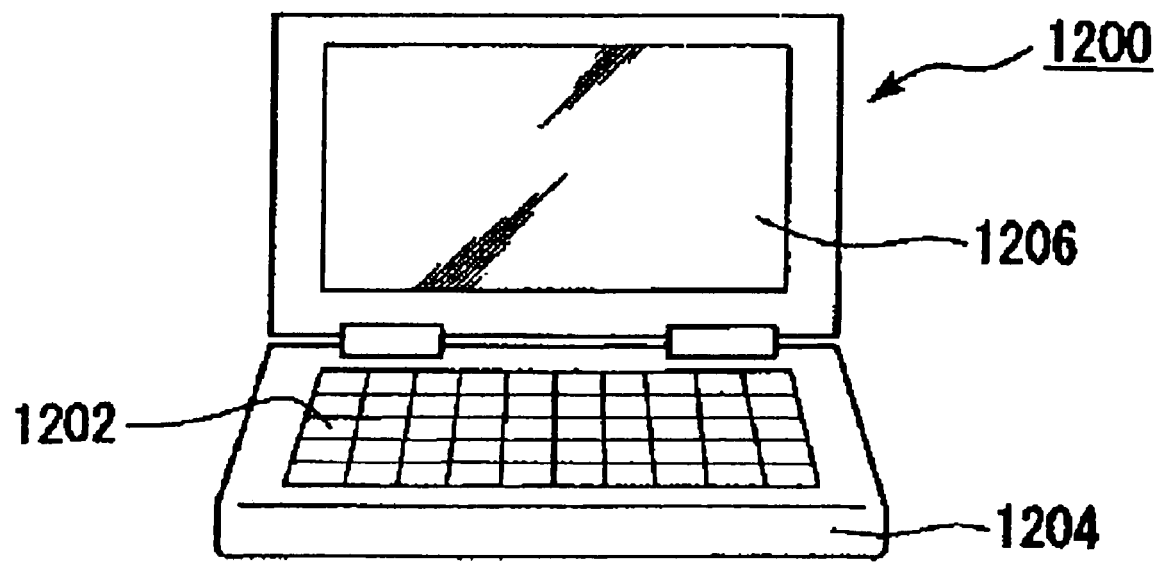
FIG. 10 is a schematic showing a further example of an electronic apparatus using the liquid crystal display device according to the present invention as a display.
Figure 11:
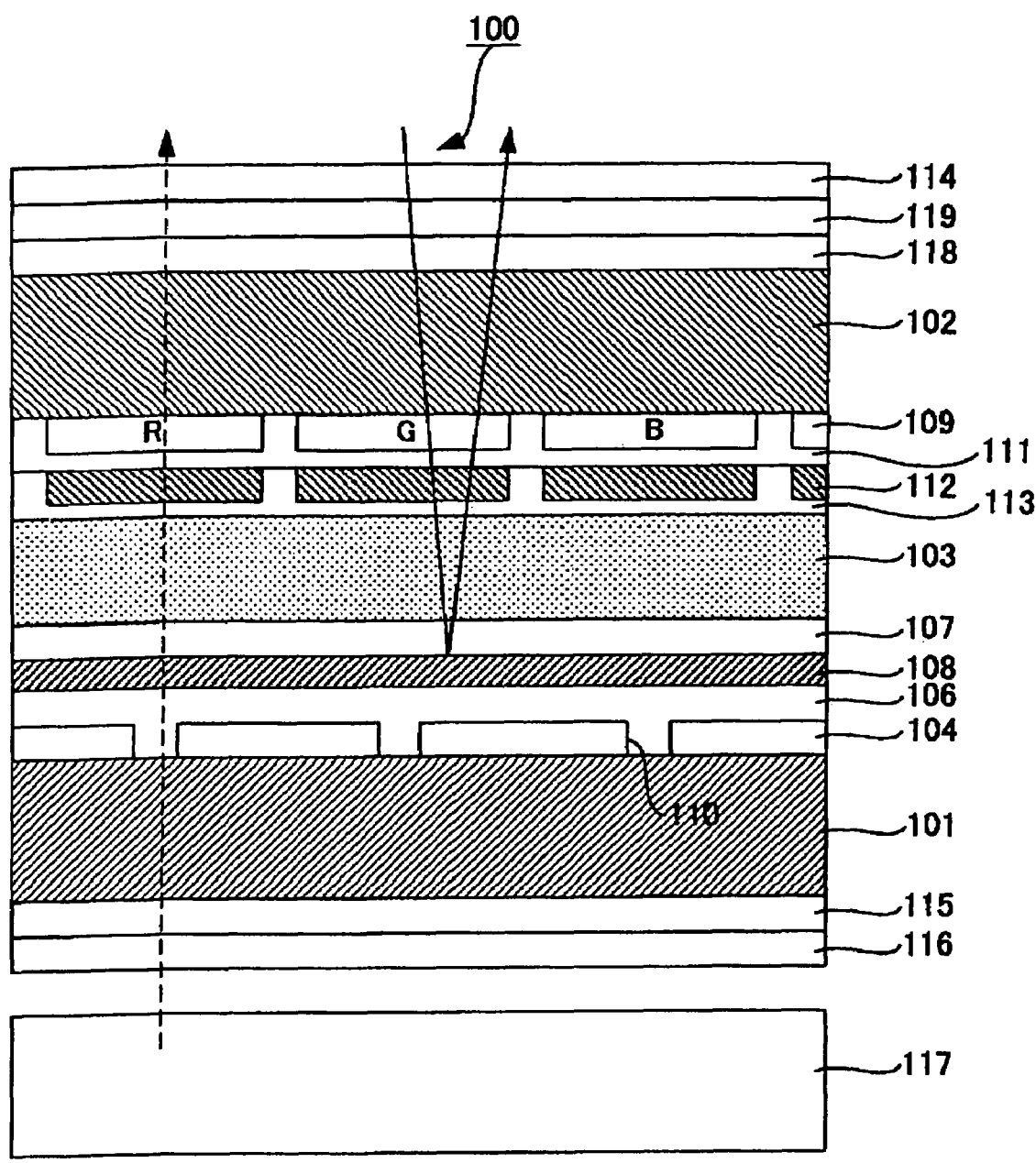
FIG. 11 is a cross-sectional view showing an example of a semi-transparent reflective liquid crystal display device.
Figure 12:
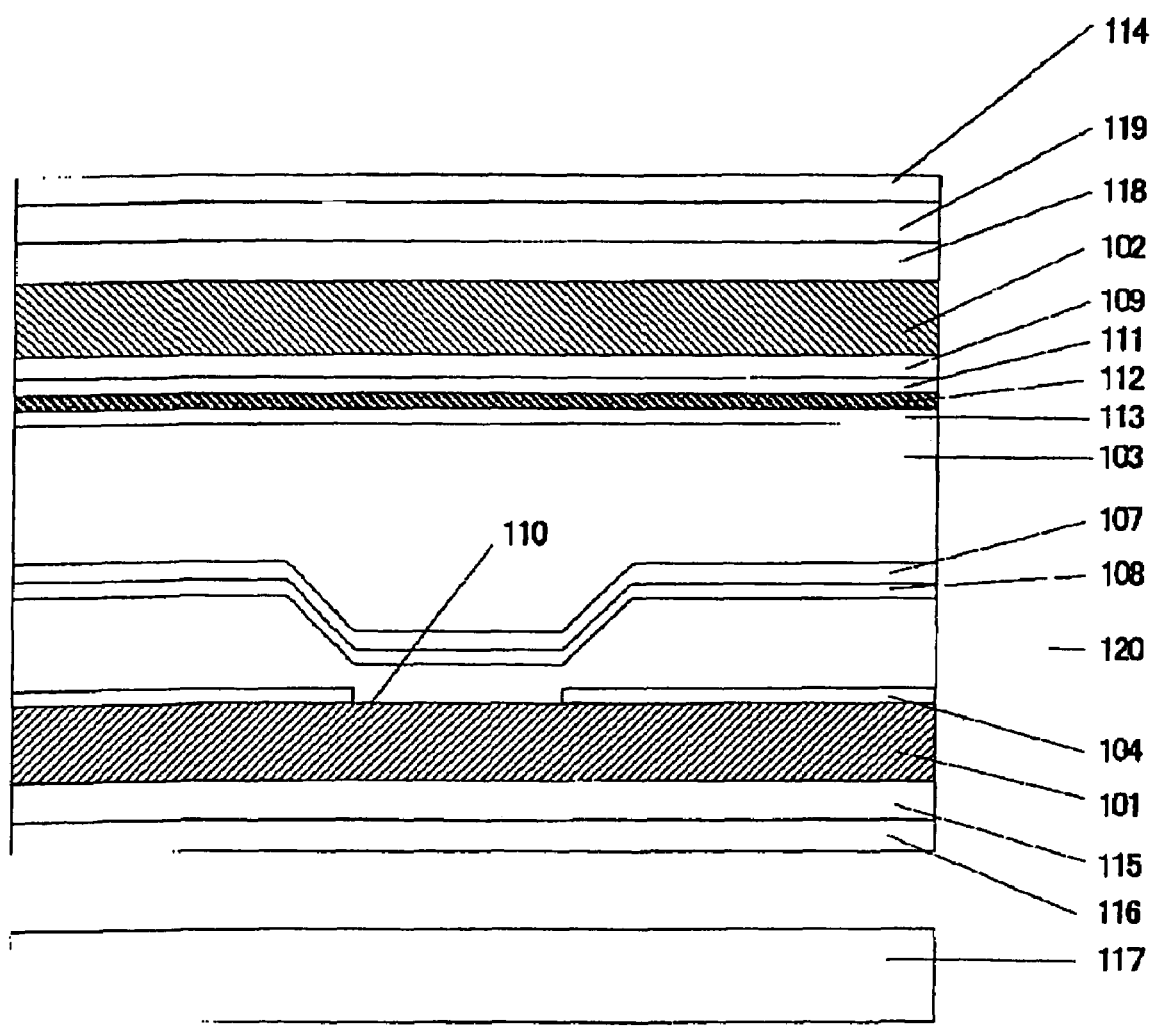
FIG. 12 is a cross-sectional view showing an example of a multi-gap semi-transparent reflective liquid crystal display device.

FIG. 10 is a perspective view showing an example of a portable information processor, such as a word processor or a personal computer, for example. In FIG. 10, reference numerals 1200, 1202, 1204, and 1206 respectively denote an information processor, an input section such as a keyboard, a main body of the information processor, and a liquid crystal display using the above-described liquid crystal display device.

Since the electronic devices shown in FIGS. 8 to 10 have the liquid crystal display using the liquid crystal display device of the above-described exemplary embodiment, they can provide a good or acceptable viewing angle characteristic.

What is claimed is:

1. A liquid crystal display device, comprising:

a liquid crystal cell including a liquid crystal layer held between an upper substrate and a lower substrate that oppose each other, and a semi-transparent reflective layer provided on an inner side of the lower substrate, the inner side being adjacent to the liquid crystal layer;

a first elliptically polarizing plate to cause elliptically polarized light to enter the liquid crystal layer through the upper substrate, the first elliptically polarizing plate including a polarizer and at least one stretched film; and a second elliptically polarizing plate to cause elliptically polarized light to enter the liquid crystal layer through the lower substrate, the second elliptically polarizing plate including a polarizer and at least one stretched film, one of the first and second elliptically polarizing plates further including at least one liquid crystal film fixed in nematic hybrid alignment, and the other of the first and second elliptically polarizing plates further including at least one liquid crystal film fixed in discotic hybrid alignment.

2. The liquid crystal display device according to claim 1, the first elliptically polarizing plate including the at least one liquid crystal film fixed in discotic hybrid alignment; and the second elliptically polarizing plate including the at least one liquid crystal film fixed in nematic hybrid alignment.

3. The liquid crystal display device according to claim 1, an angle formed between a phase-advancing axis of the liquid crystal film fixed in discotic hybrid alignment in the first elliptically polarizing plate and an axis including the azimuth direction of a director of liquid crystal molecules at almost a center of the liquid crystal layer, and an angle formed between a phase-retarding axis of the liquid crystal film fixed in nematic hybrid alignment in the second elliptically polarizing plate, and the axis including the azimuth direction of a director of liquid crystal molecules at almost a center of the liquid crystal layer, being within a range from plus 30 degrees to minus 30 degrees.

4. The liquid crystal display device according to claim 3, phase difference in plane of the liquid crystal film fixed in nematic hybrid alignment in the second elliptically polarizing plate being within a range from 90 nm to 140 nm.

* * * * *